(12) United States Patent
Radhakrishnan et al.

(10) Patent No.: US 11,625,686 B2
(45) Date of Patent: Apr. 11, 2023

(54) MANAGING REMINDERS IN A CONTENT MANAGEMENT SYSTEM

(71) Applicant: Dropbox, Inc., San Francisco, CA (US)

(72) Inventors: Kavitha Radhakrishnan, Sunnyvale, CA (US); A J Palkovic, San Francisco, CA (US); John R. Grace, Jr., Oakland, CA (US); Igor Kofman, San Francisco, CA (US); David Stinnette, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 72 days.

(21) Appl. No.: 16/821,182

(22) Filed: Mar. 17, 2020

(65) Prior Publication Data

US 2020/0219062 A1  Jul. 9, 2020

Related U.S. Application Data

(63) Continuation of application No. 15/462,847, filed on Mar. 18, 2017, now Pat. No. 10,614,420.

(Continued)

(51) Int. Cl.
*G06Q 30/00* (2012.01)
*G06Q 10/10* (2023.01)
(Continued)

(52) U.S. Cl.
CPC ......... *G06Q 10/103* (2013.01); *H04L 67/306* (2013.01); *H04L 67/55* (2022.05)

(58) Field of Classification Search
CPC .......... G06Q 10/103; G06Q 10/06395; G06Q 10/00; G06Q 10/02; G06Q 10/06;
(Continued)

(56) References Cited

U.S. PATENT DOCUMENTS

2002/0138582 A1  9/2002  Chandra et al.
2003/0131073 A1*  7/2003  Lucovsky ............... H04L 63/10
                                                        709/219

(Continued)

FOREIGN PATENT DOCUMENTS

WO       2014200634 A1    12/2014

OTHER PUBLICATIONS

Lin, Chi-Yi & Hung, Ming-Tze. (2013). A location-based personal task reminder for mobile users. Personal and Ubiquitous Computing. 18. 1-12. 10.1007/s00779-013-0646-2. (Year: 2013).*

(Continued)

*Primary Examiner* — Joseph M Waesco
*Assistant Examiner* — Jay-Ming Wang
(74) *Attorney, Agent, or Firm* — DLA Piper LLP (US)

(57) ABSTRACT

Disclosed are systems, methods, and non-transitory computer-readable storage media for managing reminders in a content management system. For example, a user can select content (e.g., a content item, content within a content item, metadata for a content item, etc.) and provide input to cause the content management system to generate a reminder related to the content. The reminder data can be generated automatically. The reminder can be generated based on user input defining attributes of the reminder. Based on a due date associated with the reminder, the content management system can cause a notification to be presented to the user so that the user can be reminded to perform a task related to the selected item of content. The user can select a representation of the reminder to cause the content management system to present the item of content associated with the reminder.

17 Claims, 13 Drawing Sheets

Related U.S. Application Data

(60) Provisional application No. 62/451,167, filed on Jan. 27, 2017.

(51) Int. Cl.
*H04L 67/306* (2022.01)
*H04L 67/55* (2022.01)

(58) Field of Classification Search
CPC ........ G06Q 10/10; G06Q 30/02; H04L 67/26; H04L 67/306; G05B 2219/31357
See application file for complete search history.

(56) References Cited

U.S. PATENT DOCUMENTS

| | | | |
|---|---|---|---|
| 2005/0240943 A1 | 10/2005 | Smith et al. | |
| 2006/0031340 A1* | 2/2006 | Mathew | H04L 51/214 707/999.2 |
| 2006/0265489 A1* | 11/2006 | Moore | H04L 67/1095 709/223 |
| 2009/0024671 A1 | 1/2009 | Johnson et al. | |
| 2011/0314111 A1* | 12/2011 | Wang | H04L 63/18 709/206 |
| 2012/0166206 A1* | 6/2012 | Feely | G06Q 10/10 705/1.1 |
| 2012/0190386 A1* | 7/2012 | Anderson | G01S 19/14 455/456.3 |
| 2013/0198652 A1* | 8/2013 | Dunn | G06Q 50/01 715/751 |
| 2014/0040374 A1* | 2/2014 | Olsen | G06Q 50/01 709/204 |
| 2014/0195626 A1* | 7/2014 | Ruff | H04W 12/086 709/206 |
| 2018/0218325 A1 | 8/2018 | Radhakrishnan et al. | |
| 2018/0309631 A1* | 10/2018 | Li | H04L 51/00 |
| 2019/0320038 A1* | 10/2019 | Walsh | G06F 9/542 |

OTHER PUBLICATIONS

Notice of Allowance from U.S. Appl. No. 15/462,847, dated Jan. 27, 2020, 9 pages.

Silvermam B. G., "Computer Reminders and Alerts," Jan. 1997, vol. 30, No. 1, pp. 42-49.

* cited by examiner

< Back to Project Widget

Widget Specification 402

Overview

A'sl lsjslgh dk shallk sls; ioe ehng,,slo yoncls;h jd sjls ls kas.Ajsdfk adjkl a'sl lsjslgh dk shallk sls; ioe ehng,,slo yoncls;h jd sjls ls kas.

Requirements

Ajsdfk adjkl a'sl lsjslgh | Quick Reminder...406 | p yoncls;h jd sjls ls
kas. Ajsdfk adjkl a'sl lsj | Configure Reminder... | g,,slo yoncls;h jd
sjls ls kas.Ajsdfk adjkl a'sl lsjslgh dk shallk sls; ioe ehng,,slo
yoncls;h jd sjls ls kas.

Lsjslgh dk shallk sls; ioe ehng,,slo yoncls;h jd sjls ls kas. Ajsdfk adjkl a'sl lsjslgh dk shallk sls; ioe ehng,,slo yoncls;h jd sjls ls kas.Ajsdfk adjkl a'sl lsjslgh dk shallk sls; ioe ehng,,slo yoncls;h jd sjls ls kas.

404

Comments 410

(PB) @Kevin can we make the widget look like
Quick Reminder...414
Configure Reminder...

412

Reminders 420

☐ Review line 43 of Widget Specification
☐ Review Phil's comment in Widget Specification 422
424

| Configure Reminder | |
|---|---|
| Type | Review 502 ▶ |
| Description | |
| Respond to Phil's comment in Widget Specification. 504 | |
| Due date | |
| 506 January 23, 2017 508 | |
| Save | Cancel |

510  512

500

MANAGING REMINDERS IN A CONTENT MANAGEMENT SYSTEM

RELATED APPLICATION

This is a continuation of U.S. patent application Ser. No. 15/462,847, filed on Mar. 18, 2017, which claims the benefit of U.S. Provisional Application No. 62/451,167, filed on Jan. 27, 2017, the content of which is incorporated herein by reference in its entirety.

BACKGROUND

Digital document users often touch hundreds of digital documents each day while working on multiple different projects. As a user moves between tasks, it can be difficult to remember which documents that user was working on or what he intended to do with them. This can be particularly true where multiple people have access to the same set of documents, which means the document may have been edited, and thus look different, when the user returns to it. The various methods for tracking tasks, when applied to a set of documents, tend to be inaccurate and susceptible to loss of context. Thus, users find themselves without a reliable, in-context way to remember what they were thinking or what they intended to do in relation to specific portions of documents.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing reminders in a content management system. For example, a user can select an item of content (e.g., a content item, content within a content item, metadata for a content item, etc.) and provide input to cause the content management system to generate a reminder related to the selected item of content. The reminder can be generated automatically. The reminder can be generated based on user input defining attributes of the reminder. Based on a due date associated with the reminder, the content management system can cause a notification to be presented to the user so that the user can be reminded to perform a task related to the selected item of content. The user can select a representation of the reminder to cause the content management system to present the item of content associated with the reminder.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 4 illustrates an example graphical user interface for creating reminders associated with content of a content item;

FIG. 5 illustrates an example graphical user interface for configuring a reminder;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for generating reminders associated with items of content in a content management system. For example, as more and more users use collaboration environments (e.g., content management systems, cloud storage environments, networked productivity software, etc.) to collaborate on content items, share ideas, and communicate with other collaborators, the complexity of keeping track of tasks and/or action items associated with a large number of content items increases. A convenient way to create reminders tied to content items, content within content items, and/or metadata (e.g., comments) associated with content items is needed so that a user can better recall what content items the user intends to return to and why. In addition, reminders can assist users in being more responsive to other collaborators who might be working on the same content items.

Figure 1A:
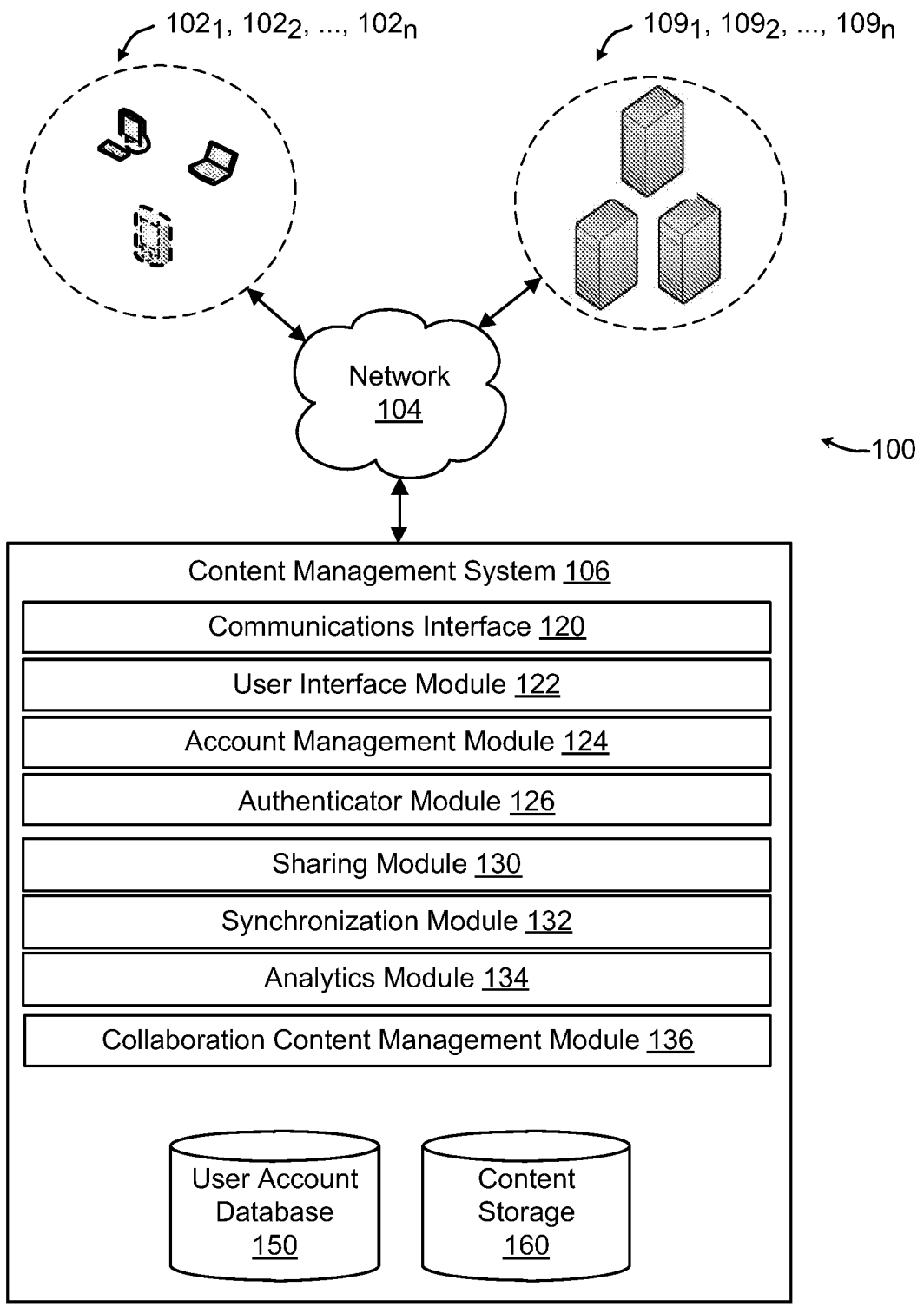
FIG. 1A shows an example configuration of devices and a network in accordance with some embodiments.

With respect to implementing various embodiments of the disclosed technology, an example system configuration 100 is shown in FIG. 1A, wherein electronic devices communicate via a network for purposes of exchanging content and other data. The system can be configured for use on a wide area network such as that illustrated in FIG. 1A. However, the present principles are applicable to a wide variety of network configurations that facilitate the intercommunication of electronic devices. For example, each of the components of system 100 in FIG. 1A can be implemented in a localized or distributed fashion in a network.

In system 100, a user (e.g., an individual, group of users, company, etc.) can interact with content management system 106 (e.g., an online synchronized content management system) through client devices $102_1$, $102_2$, . . . , $102_n$ (collectively "102") connected to network 104 by direct and/or indirect communication. Content management system 106 can include a single computing device (e.g., a server) or multiple computing devices (e.g., multiple servers) that are configured to perform the functions and/or operations necessary to provide the services described herein. Content management system 106 can support connections from a variety of different client devices 102, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type, usage information, (e.g., file access or edit history), storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, collaboration content items, text files, audio files, image files, video files, webpages, executable files, binary files, placeholder files that reference other content items, etc., from one or more client devices 102 authorized on the account. The content items can also include collections for grouping content items together with different behaviors, such as folders, playlists, albums, etc. For example, an account can include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or can be some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection.

A user can view or manipulate content via a web interface generated and served by user interface module 122. For example, the user can navigate in a web browser to a web address provided by content management system 106. Changes or updates to content in the content storage 160 made through the web interface, such as making edits to text or media that are part of the content item, can be propagated to other client devices 102 authorized to access the content item. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1$, $109_2$, . . . , $109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content items. Sharing content items can include making the content item accessible from any computing device in network communication with content management system 106. Sharing content items can also include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some implementations, to share a content item, sharing module 130 can be configured to add a user account identifier to the content entry associated with the content item, thus granting the added user account access to the content item. Sharing module 130 can also be configured to remove user account identifiers from a content entry to restrict a user account's access to the content item.

In some implementations, to share a content item, sharing module 130 can be configured to generate a custom network address, such as a uniform resource locator (URL), which allows web browsers to access the content in content management system 106, which in some implementations, can be allowed without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In some implementations, content management system 106 can include collaboration content item management module 136. Collaboration content item management module 136 can provide an interactive content item collaboration platform whereby users can simultaneously create collaboration content items, comment in the collaboration content items, and manage tasks within the collaboration content items. Collaboration content items can be files that users can create and edit using a collaboration content items editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed as multiple users access a content item through a web interface and there they can work on the same copy of the content item at the same time.

In some implementations, portions of a collaboration content item can be represented by a list of attributed text (e.g., a string of text where each character or character range has a set of attributes). An attribute can be a (key, value) pair: for example, ("bold", "true"), ("list", "bullet1"), or ("author", authorID). Furthermore, a collaboration content item can be stored as a sequence of change sets. A change set represents an edit to a particular version of a collaboration content item. Applying a change sets can insert and delete characters and apply attributes to ranges. Thus, a given change set can be applied to a particular collaboration content item representation to generate another collaboration content item representation. For example, a collaboration content item representation "abc\n" and a change set "insert d at position 2", which when applied, would yield a collaboration content item representation "abdc\n". Applying all of the change sets, in a given order, to an initial version of a collaboration content item representation, can produce a current version of the collaboration content item comprising a list of attributed text representation. Multiple users may access, view, edit, and collaborate on a collaboration content item at the same time or at different times. In some embodiments this can be managed by providing multiple users with access to a content item through a web interface where they can interact with a same copy of the content item at the same time.

While content management system 106 is presented with specific components, it should be understood by one skilled in the art, that the architectural configuration of system 106 is simply one possible configuration and that other configurations with more or fewer components are possible.

Figure 1B:
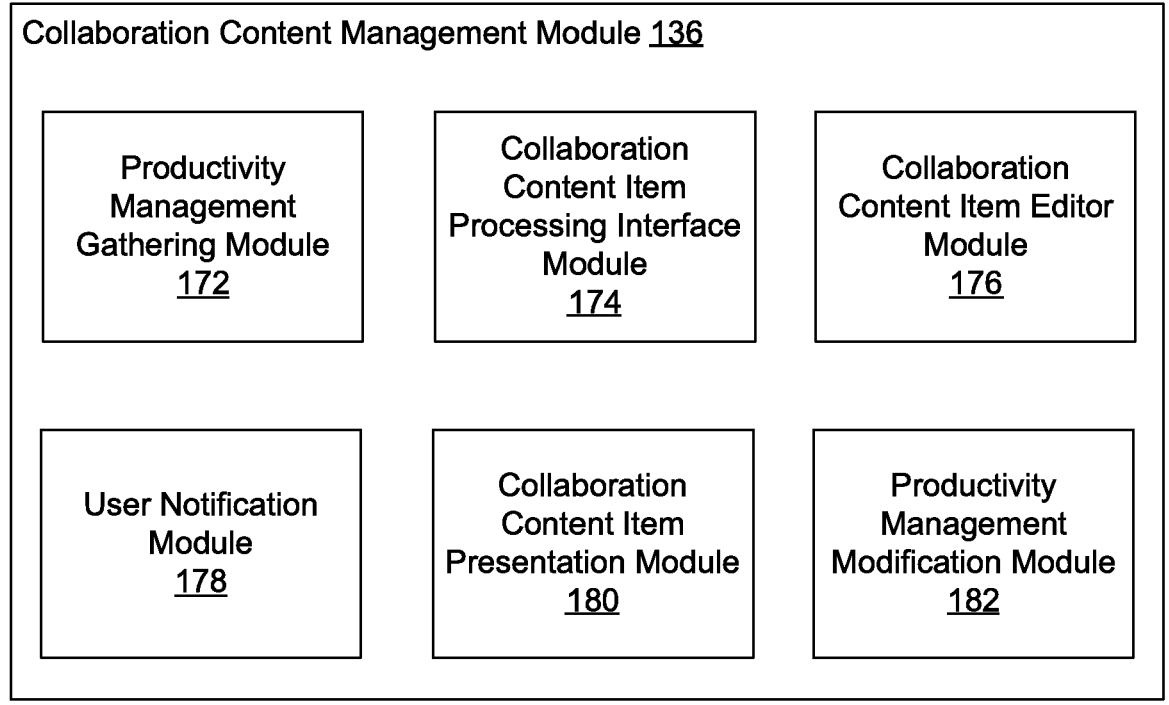
FIG. 1B shows an example collaboration content management module in accordance with some embodiments.

FIG. 1B shows an example collaboration content management module 136, according to some embodiments. Collaboration content management module 136 may include productivity management gathering module 172, collaboration content item processing interface module 174, collaboration content item editor module 176, user notification module 178, collaboration content item presentation module 180, and productivity management modification module 182. One or more of productivity management gathering module 172, collaboration content item processing interface module 174, collaboration content item editor module 176, user notification module 178, collaboration content item presentation module 180, and productivity management modification module 182 may be coupled to one another or to modules not explicitly shown.

Productivity management gathering module 172 may be configured to gather productivity data from productivity management system 140. In various embodiments, productivity management gathering module 172 identifies an event and gathers information related to the event. For instance, productivity management gathering module 172 may gather a specific calendar entry and/or a specific task from an online calendar. Productivity management gathering module 172 may further gather information from the calendar entry or gather information related to the calendar entry such as time(s), date(s), relevant locations, title(s), agenda(s), summaries, description(s), and/or attendees related to the event. Productivity management gathering module 172 may provide the productivity data to the other modules of collaboration content management module 136.

Collaboration content item processing interface module 174 may be configured to interface with collaboration content management module 136. In various embodiments, collaboration content item processing interface module 174 may provide collaboration content items to one or more modules of collaboration content management module 136, as described further herein.

Collaboration content item editor module 176 may be configured to create and/or modify collaboration content items. A collaboration content item may be created in a variety of ways. In some embodiments, collaboration content item editor module 176 enables creation of the collaboration content item into the content management system 106. Collaboration content item editor module 176 may enable access to or be any collaboration content item editing application (e.g., Microsoft Word®, Google Docs®, or the like) either in the cloud or executed locally. In one example, content management system 106 may provide to one of client devices 102 a user interface element (e.g., a box or a button) that allows creation of a new collaboration content item.

In some embodiments, collaboration content item editor module 176 may create the collaboration content item in conjunction with the productivity management system 140. For example, collaboration content item editor module 176 may provide a suggestion to a user to create or invoke a collaboration content item associated with an upcoming event. In various embodiments, collaboration content management module 136 may identify a user that is opening or otherwise using collaboration content item editor module 176. Productivity management gathering module 172 may identify an upcoming event for the user on the user's calendar. Subsequently, collaboration content editor module 176 may provide a suggestion to the user to create or invoke the collaboration content item associated with the upcoming event.

Although it is discussed that collaboration content item editor module 176 may provide a suggestion to the user to create or invoke the collaboration content item associated with the upcoming event, it will be appreciated that the suggestion to create or invoke the collaboration content item may be made by any application. For example, a user may log into and/or otherwise access any application or suite of applications. Once the user is identified and an upcoming event is identified on the user's calendar, any application may provide the user with the suggestion to create or invoke the collaboration content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaboration content item in response to the suggestion, collaboration content item editor module 176 may create or invoke the requested collaboration content item. If the application that provided the suggestion to the user is not a collaboration content item editor, then a collaboration content item editor may be executed and the requested collaboration content item created and/or invoked in response to the user's request.

In accordance with some embodiments, collaboration content item editor module 176 may configure the productivity management system 140 to provide access to the collaboration content item (e.g., using a link, including the collaboration content item, or any other mechanism to enable access to the collaboration content item) in a meeting request, a task entry, or the like. In some embodiments, collaboration content item editor module 176 may instruct productivity management system 140 to place an icon corresponding to a link to the collaboration content item in the calendar entry, meeting request, task entry, or the like. When a user has opened the link (e.g., by clicking the icon), the user may be directly guided to the collaboration content item from the meeting request, task entry, or the like. In one example, the link in the calendar entry may provide the user (e.g., using client device 102) access to a collaboration content item stored in content management system 106 (e.g., in storage accessible through the cloud) or in productivity management system 140.

Once the user requests to create or invoke the collaboration content item, collaboration content item editor module 176 may create and/or invoke a collaboration content item. The collaboration content item may be subsequently edited, altered, viewed, changed, stored, and/or the like by an editing application (e.g., either stored locally on a client device 102 or in the cloud). In various embodiments, one or more different client devices 102 may utilize different editing applications to make changes to the collaboration content item. Collaboration content item editor module 176 and/or other editing applications may allow for the collaboration content item to be changed by multiple different users using different client devices 102 at the same time or substantially at the same time (e.g., in real time or substantially in real time).

It will be appreciated that users may be automatically guided to a collaboration content item related to a calendar entry, meeting request, a task entry, or the like without human intervention. In some embodiments, users may be guided to a collaboration content item related to a calendar entry, a meeting request, a task entry, or the like without having the users separately open collaboration content item editing applications. Such functionalities may prove particularly convenient for users seeking to take, review, or collaborate on notes associated with an event, as these users need not open applications other than productivity management applications.

Collaboration content item editor module 176 may receive from users additional content for the collaboration content item. For example, collaboration content item editor module 176 may be configured to receive from the client devices 102 changes or edits to the collaboration content item. In various embodiments, the changes may include text, characters strings, or the like. The changes may also include annotations to the collaboration content item, comments to the collaboration content item, files to be attached to the collaboration content item, pictures to be attached to the collaboration content item, links to be attached to the collaboration content item, tasks related to the collaboration content item, or the like that can be incorporated into the collaboration content item. In various embodiments, edits to the collaboration content item are collaboration. For instance, collaboration content item editor module 176 may obtain edits (e.g., text changes and/or additions of audio files, pictures, tables, or the like) from any number of client devices 102 at a given time (or in real time). Collaboration edits may be incorporated in a variety of formats, including formats that provide different text attributes such as colors, fonts, styles, or the like for different users.

In various embodiments, collaboration content item editor module 176 (and or a security or permissions module associated with a server) may establish permissions and/or security for the collaboration content item. For example, collaboration content item editor module 176 may enable event attendees to view and/or make edits to the collaboration content item while others may not have rights to view the collaboration content items and/or make changes. Permissions and/or security may be enforced in any number of ways. However, access to the collaboration content item may, in various embodiments, be provided to attendees of the event or a subset of attendees.

In some implementations, users can enter commands by providing pre-established primitives. A primitive can be a specified sequence of one or more characters that the content management system 106 recognizes as mapped to particular functionality. In some implementations, a primitive can be followed by one or more parameters specifying how the system should implement the corresponding functionality. Examples of primitives include a user identification primitive (e.g., "@" followed by a username parameter—referred to herein as a mention of a user), a task creation primitive (e.g., "[ ]" followed by a task title parameter), an emoji selector primitive (e.g., ":"), a content item selector and reference insertion primitive (e.g., "+" followed by at contentItem title parameter), a bullet list primitive (e.g., "*"), etc. Primitive parameters can define the corresponding functionality in various ways. For example, the + primitive can operate by taking the content specified by a contentItemTitle parameter and attempting to match it to an existing content item. In some implementations, when such a match is found, the primitive, and any associated parameter, can be replaced in the collaboration content item with a reference to the content item, such as a URL. Such a reference, when activated, can load the referenced collaboration content item. In some implementations, a primitive can take another primitive as a parameter. For example, the content "[ ] @kingHenry" can be interpreted such that @kingHenry links to a user with the username "kingHenry," and this link is used by the primitive "[ ]" to creates a new task, where that task is assigned to the kingHenry user.

In various embodiments, collaborative content item editor module 176 (and or a security or permissions module associated with a server) may establish permissions and/or security for the collaborative content item. For example, collaborative content item editor module 176 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaboration content item is limited based on storage access rights. For example, a user with access rights to cloud storage may access, view, and/or make changes to the collaboration content item. In some embodiments, a user with access rights assigned by the content management system 106 may access, view, and/or make changes to the collaboration content item.

User notification module 178 may be configured to notify users of each of the client devices 102 of information related to the state and/or contents of the collaboration content item. Notifications may be sent, for example as an email notification, a chat message notification, a notification in a display of the collaboration content item, or in relation to the collaboration content item through a file system or other organizational system. In various embodiments, user notification module 178 provides notifications about changes to the client devices 102. For example, user notification module 178 may notify users whether a collaboration content item has been created for an event. As another example, user notification module 178 may notify specific users that they have been invited to attend an event.

Collaboration content item presentation module 180 may provide to the client devices 102 selected collaboration content items. The collaboration content items may be displayed in the client devices 102 through a native application, an Internet browsing window, or the like supported by the client devices 102.

It will be appreciated that collaboration content item presentation module 180 may restrict writing permissions to the collaboration content items at any time. In an example, prior to occurrence of the event, collaboration content item presentation module 180 may restrict writing permissions to the collaboration content item (and turn the collaboration content item into a read-only collaboration content item) for all users except the creator or invoker of the collaboration content item. In some embodiments, the creator or invoker of the collaboration content item may select a subset of recipients to receive writing permissions.

Collaboration content item presentation module 180 may also support a collaboration content item viewing portal users can use to view existing collaboration content items. The collaboration content item viewing portal may order specific collaboration content items based on one or more ordering factors. "Ordering factors," as used herein, may include any factors used to order collaboration content items. Ordering factors can include factors used to order collaboration content items chronologically. More specifically, in some embodiments, the collaboration content item viewing portal orders collaboration content items according to the date(s) and/or times the collaboration content items were created. The collaboration content item viewing portal may also order collaboration content items according to the date(s) and/or time(s) the collaboration content items were edited. In various embodiments, the collaboration content item viewing portal orders collaboration content items according to the date(s) and/or time(s) of corresponding events to which the collaboration content items were related. Ordering factors can also include factors used to order collaboration content items according to the preferences of a specific user, such as whether the user has accepted events to which the collaboration content items were related.

In some embodiments, a collaboration content item viewing portal may be dedicated to a particular user who has received access to the collaboration content item because the particular user was related to an event. The user's collaboration content item viewing portal may provide access to any number of collaboration content items including the collaboration content item. The collaboration content items represented in the collaboration content item viewing portal may be ordered in any number of ways. For example, the collaboration content item viewing portal may order collaboration content items based on date and time of corresponding events.

The collaboration content item viewing portal may support search functions. For instance, the collaboration content item viewing portal may enable or allow searching for collaboration content items according to textual strings, titles, event attendees, and/or other attributes. The search functions may allow a specific user to search one or more collaboration content items for that user or for other users.

In some embodiments, productivity management modification module 182 may be configured to coordinate collaboration content items with calendar entries and to enable access to the collaboration content item through calendar entries.

Figure 2:
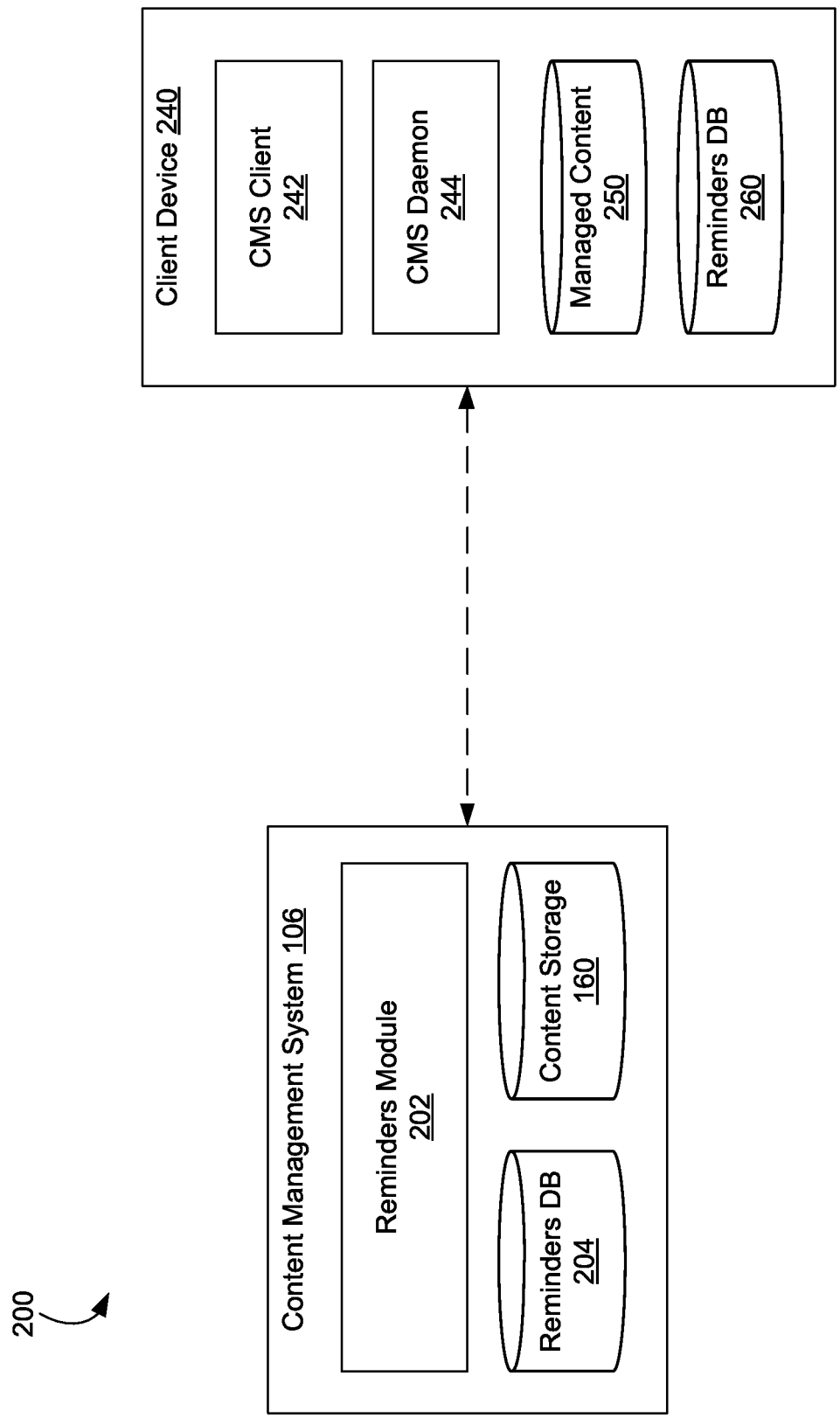
FIG. 2 is a block diagram of an example system for managing projects in a content management system.

FIG. 2 is a block diagram of an example system 200 for managing projects in a content management system. For example, system 200 can correspond to system 100 of FIG. 1A, described above. As described above, system 200 can include content management system 106.

In some implementations, content management system 106 can include reminders module 202. For example, reminders module 202 can be a software module installed and/or running as part of content management system 106. Reminders module 202 can manage reminders (e.g., create reminders, store reminders, send reminder notifications to client devices, present reminder notifications, etc.). Reminder module 202 can generate views (e.g., graphical user interfaces) for presenting reminders to a user. Reminder module 202 can, for example, store and/or manage reminder data (e.g., reminders, reminder attributes, data mapping reminders to user accounts, etc.) associated with reminders in reminders database 204. For example, reminders database 204 can be stored in content storage 160. Reminders database 204 can be stored separately from content storage 160.

In some implementations, system 200 can include client device 240. For example, client device 240 can correspond to client device $102_i$ described above. Although FIG. 2 illustrates a system 200 having only one client device 240 (e.g., client device $102_i$), system 200 can include many client devices 240 (e.g., client devices $102_i$-$102_n$) that interact with content management system 106 and/or reminders module 202 to manage (e.g., create, edit, change status, etc.) reminders.

In some implementations, client device 240 can include content management system (CMS) client 242. For example, CMS client 242 can be a native application of client device 240. For example, a native software application can be an application that is built specifically for the hardware and/or software configuration of client device 240. Thus, the graphical user interfaces (and other functionality) of CMS client 242 described below can be implemented using instructions, application programming interfaces (APIs), and other technologies native to client device 240. To generate the various graphical user interfaces below and/or implement various features described herein, CMS client 242 can request reminders data from reminders module 202 over a network connection (e.g., through network 104). Reminders module 202 can obtain reminder data from reminders database 204, for example, and send the reminders data to CMS client 242. CMS client 242 can then present the reminders data on various graphical user interfaces generated by CMS client 242, as described below.

In some implementations, CMS client 242 can perform some or all of the features, operations, and/or functions performed by reminders module 202, as described herein. For example, CMS client 242 can perform the operations for receiving input defining a reminder, creating a reminder, storing a reminder, and/or presenting a reminder independently from content management system 106. Thus, CMS client 242 may manage reminders on client device 240 while client device 240 is offline or disconnected from content management system 106. Once client device 240 is back online and a connection with content management system 106 is established, CMS client 242 and/or CMS daemon 244 can send or synchronize the reminders data generated by CMS client 242 with content management system 106. Thus, reminders can be managed by reminders module 202 through a real-time, or near real time, data exchange or reminders can be managed through an asynchronous or delayed data exchange between content management system 106 and client device 240.

In some implementations, CMS client 242 can be a web client executed by a web browser running on client device 240. Thus, the graphical user interfaces (and other functionality) of CMS client 240 can be implemented using instructions, APIs, and other technologies that are not native to client device 240. For example, CMS client 240 can be built as a web application using non-native web code or instructions. CMS client 240 can be served by content management system 106 to a web browser on client device 240 and the web browser can execute CMS client 240 to present the graphical user interfaces (and other functionality) to the user, as described in detail below. To generate the various graphical user interfaces below and/or implement various features described herein, CMS client 242 (e.g., the web browser) can request various reminders views (e.g., graphical user interfaces, web pages, etc.) from reminders module 202 or various reminders views can be automatically provided (e.g., "pushed") from reminders module 202 to CMS client 242. Reminders module 202 can generate the reminders views (e.g., the graphical user interfaces described below) for presenting reminder data and send the reminders views to CMS client 242 over a network connection (e.g., through network 104). For example, reminders module 202 can obtain reminders data from reminders database 204, generate the reminders views based on the reminders data, and send the reminders views to CMS client 242. CMS client 242 can then present the reminders views on a display of client device 240. In some implementations, content management system 106 can send reminder data to CMS client 242 on client device 240 and CMS client can generate and present the reminders view.

In some implementations, client device 240 can include CMS daemon 244. For example, CMS daemon 244 can be a client of content management system 106 that maintains synchronization of data between content management system 106 and client device 240. For example, client device 240 can include managed content 250. Managed content 250 can be a portion of the file system on client device 240 managed by content management system 106 and/or CMS daemon 244. CMS daemon 244 and/or content management system 106 can synchronize content items, reminders data, etc., stored in managed content 250 with content items, reminders data, etc., stored in content storage 160. For example, managed content 250 can include reminders database 260 that includes reminders data for reminders associated with the user of client device 240. CMS daemon 244 and/or content management system 106 can synchronize the user's reminders data stored in reminders database 204 with the reminders data in reminders database 260 so that the user of client device 240 can have access to the user's reminders through CMS client 242 when client device 240 is offline (e.g., not connected to content management system 106).

Figure 3:
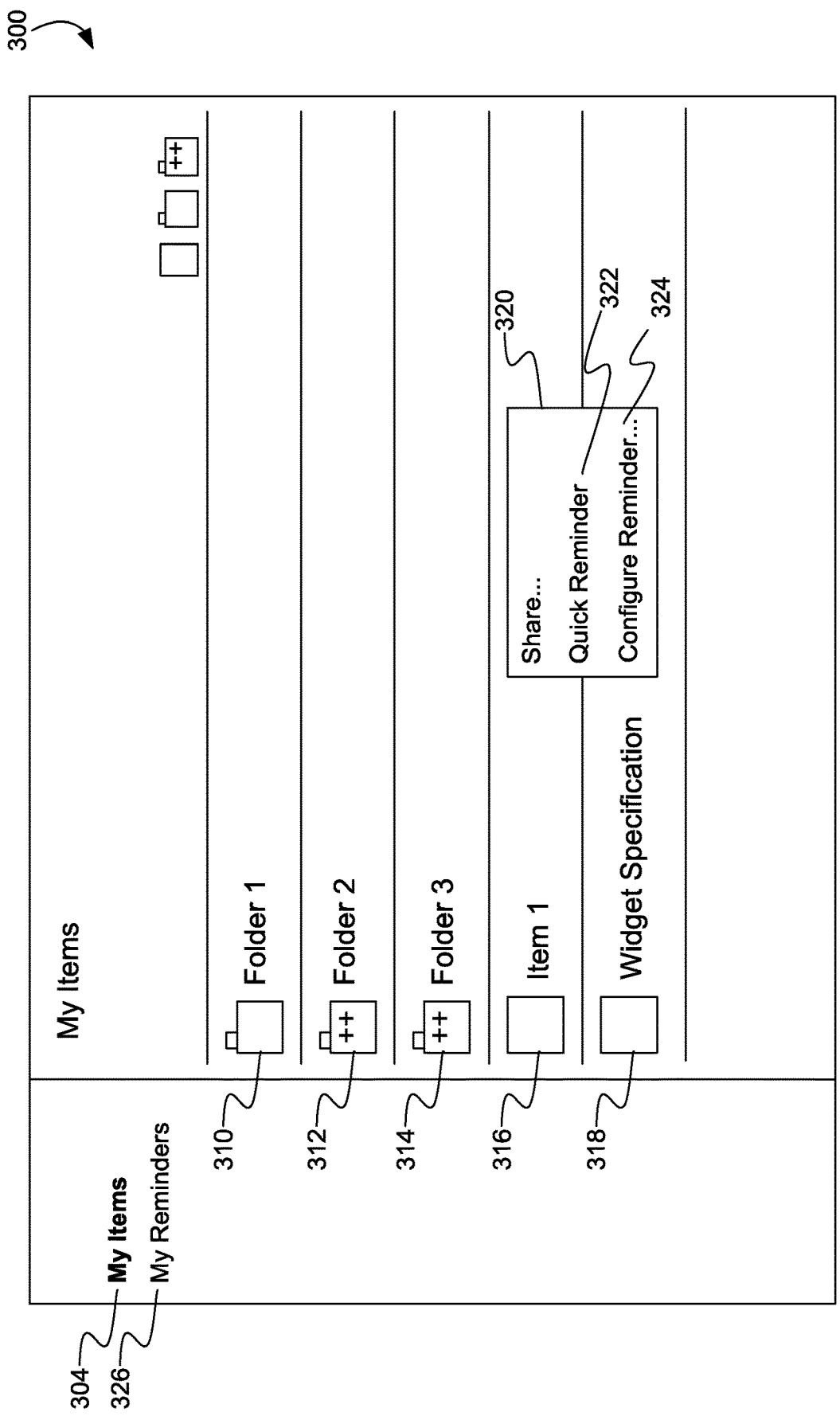
FIG. 3 illustrates an example graphical user interface for generating a reminder associated with a content item.

FIG. 3 illustrates an example graphical user interface 300 for generating a reminder associated with a content item. For example, GUI 300 can be presented by CMS client 242 on a display of client device 240 when a user is logged into the user's account with content management system 106 through CMS client 242. CMS client 242 can exchange data creating and/or defining reminders with reminders module 202. This data can cause reminders module 202 to create new reminders for the user currently logged into content management system 106 through CMS client 242.

In some implementations, GUI 300 can present content items associated with the user's account. For example, the user may select graphical element 304 to view content items 310-318 (e.g., files, folders, images, etc.) accessible to the user from the user's account. GUI 300 can, for example, include content items that the user is collaborating on with other users (e.g., collaboration content items). GUI 300 can include content items that the user is working on independently. In either case, the user may want to return to a content item at a later time without having to keep the content item open or have to create a list of content items and remember to go back and open them. For example, a user may have certain tasks to perform with respect to content items such as reviewing another user's work product. As another example, a user may be viewing a particular content item when the user has to switch to another project but the user doesn't want to forget to come back to where she left off in the current content item. To prevent the user from forgetting to come back to the relevant content items in a timely manner, the user can create reminders associated with the content items.

In some implementations, a reminder can include attributes such as a reminder type, a reminder description, a reminder due date, and/or a reference to the content item associated with the reminder. The reminder description can be text that describes or indicates the purpose of the reminder or what the reminder is related to. The reminder due date can be a date when the reminder should be presented. The reminder type can be some predefined type, such as "review," "send," "edit," etc. The reference can be a pointer, identifier, link, etc. that can be used to identify or obtain a content item associated with the reminder.

In some implementations, GUI 300 can include graphical element 320 for creating a reminder associated with a content item. For example, the user can select a content item presented on GUI 300 to cause graphical element 320 (e.g., a window, popup, dialog box, etc.) to be presented on GUI 300. The user can, for example, place a cursor over content item 316 and provide input to a button of an input device (e.g., right click on a mouse) to cause CMS client 242 to present graphical element 320. When client device 240 is capable of receiving touch input, the user may provide a touch gesture (e.g., a two finger tap) at the location where content item 316 is presented on a touch sensitive display of client device 240. Additional mechanisms for creating a reminder are also possible, including mechanisms that do not first require user selection of content. For example, a side-bar or other control pane can include a create reminder graphical element. As part of the reminder creation process, a user can specify content to which the reminder is associated. For example, the user can select a content item from a file chooser or @ mention a particular content item.

In some implementations, graphical element 320 can include quick reminder option 322. When quick reminder option 322 is selected by a user, a reminder can be automatically generated for the selected content item. For example, when quick reminder option 322 is selected, reminders module 202 can automatically determine each of the attributes for the new reminder and create the reminder without further input from the user with respect to the reminder. The quick reminder option 322 can, therefore, cause reminders module 202 to generate a new reminder for the selected content item in response to a single user input.

In some implementations, reminders module 202 can automatically select the attributes for the quick reminder based on default (e.g., predefined or configured) values for each attribute. For example, reminders module 202 can automatically select a "review" reminder type. As another example, reminders module 202 can automatically select the name or identifier of the selected content item (e.g., the content referenced by the reminder), a snippet of text from the selected content item, or a preview of the selected content item (e.g., a thumbnail) as the description. As a further example, reminders module 202 can automatically select an amount of time (e.g., the day after the current day; a number of minutes, hours, or days; or etc.) as the due date for the reminder. In some implementations, any of these attributes can be left unspecified for automatically created quick reminders. Reminders module 202 can configure the reference attribute of the reminder to point to the selected content item (or content within the selected content item, as described below). Reminders module 202 can then create the reminder for the content item based on these default or user configured (e.g., preconfigured) attribute values and store the reminder in association with the user's account with content management system 106. For example, reminder's module 202 can store the reminder (e.g., reminder attributes) in a record of reminders database 204 that maps the reminder to the user's account (e.g., account identifier) with content management system 106.

In some implementations, reminders module 202 can automatically select the attributes for the quick reminder based on context. In some implementations, reminders module 202 can automatically select a reminder type, e.g., based on how the current user has previously interacted with similar content items (e.g., content items with similar authorship, content items with similar words or phrases, content items with similar titles, content items that have been accessed or shared by a similar set of users, etc.). For example, the type can be set to "review" when the user tends to just read, without editing, content items with similar words as a selected content item. As another example, the type can be set to "send" when the current user tends to share content items that were authored by the same user as a selected content item.

The reminders module 202 can further select the attributes for the quick reminder based on how the current user, or similar users, have created reminders in the past. For example, if the current user, or users similar to the current users nearly always select one day for the due date, this can become the default due date for quick reminders. Furthermore, reminders module 202 can further select the attributes for the quick reminder based on how previous reminders, by other users, for the selected content item have been configured. For example, if the selected content item is generally selected for "send" type reminders, this can become the default type for reminders on that content item.

In some implementations, graphical element 320 can include configure reminder option 324. For example, the user can select graphical element 324 to cause CMS client 242 to present GUI 500 of FIG. 5, described below. The user can then define the new reminder by specifying values for at least some of the attributes of a new reminder. For example, the value of the reference attribute may be automatically determined by reminder module 202 while other attributes (type, description, due date, etc.) may be defined by the user. The user can provide input to save the user-specified reminder and, in response, reminders module 202 can save the reminder in association with the user's account with content management system 106. For example, reminders module 202 can store the reminder (e.g., reminder attributes) in a record of reminders database 204 that maps the reminder to the user's account (e.g., account identifier) with content management system 106.

FIG. 4 illustrates an example graphical user interface 400 for creating reminders associated with content (e.g., attributed text, images, video, or metadata such as comments) of a content item. For example, GUI 400 can be presented by CMS client 242 when a user selects a content item (e.g., content item 318) managed by content management system 106 to view and/or edit. GUI 400 can present content and/or metadata (e.g., comments, reminders, etc.) associated with the selected content item. CMS client 242 can obtain the selected content item from content management system 106 over a network connection. CMS client 242 can obtain the selected content item locally on client device 240 from managed content 250.

In some implementations, reminders module 202 can generate a reminder associated with content within a content item. For example, a user can provide input to GUI 400 selecting content (e.g., text, images, comments, etc.) within the selected content item. For example, content may be a comment that a user needs to review or edit as part of the user's job. The user may wish to create a reminder so that the user is reminded later to review or edit the selected content.

After selecting content, the user can provide input (e.g., right click, two finger touch gesture, etc.) to invoke graphical element 406. In some implementations, graphical element 406 can be presented automatically upon receiving a user selection. In some implementations, control elements corresponding to graphical element 406 can be persistently displayed such as in a control ribbon. For example, graphical element 406 can correspond to graphical element 320 described above. However, in this case, the reference attribute of a new reminder generated by selecting a reminder option from graphical element 406 can be configured to refer to a location within the selected content item rather than merely pointing to the selected content item. The location within the content item can be specified as a bit, byte, character, line or paragraph number within the content item. Thus, when the quick reminder option is selected from graphical element 406, reminders module 202 can automatically select the attributes for a new reminder, generate the new reminder, and store the new reminder without further input from the user, as described above. When the configure reminder option is selected from graphical element 406, CMS client 242 can present GUI 500 to allow the user to specify the values of the attributes associated with the new reminder.

In some implementations, GUI 400 can include comments area 410. For example, comments area 410 can include or present comments created by users of content management system 106 with respect to the content item presented in GUI 400. The comments presented in comments area 410 can be, for example, stored as metadata associated with the content item. Such metadata can be referred to as being part of the content item, whether or not it is stored with other content of the content item. In the example of GUI 400, comments area 410 can include comment 412 generated by a user "Phil" and directed to another user "Kevin" (e.g., the user of client device 240). Kevin may not have time to adequately respond to Phil's comment at the present time. Thus, Kevin may wish to create a reminder to come back later and respond to Phil's comment.

In some implementations, the user (in this case, Kevin) can provide input to create a reminder with respect to comment 412. For example, the user can provide input (e.g., right click, two finger touch gesture, etc.) with respect to comment 412 to both select comment 412 and cause CMS client 242 to present graphical element 414 on GUI 400. As with graphical element 406, graphical element 414 can be provided in other ways. For example, graphical element 414 can correspond to graphical element 406 and/or graphical element 320 in that graphical element 414 can present options for generating a reminder with respect to comment 412. However, in this case, the reference attribute of a new reminder generated by selecting a reminder option from graphical element 414 can be configured to refer to comment 412 or a comment identifier associated with comment 412 within the metadata of the selected content item. Thus, when the quick reminder option is selected from graphical element 414, reminders module 202 can automatically select the attributes for a new reminder, generate the new reminder, and store the new reminder without further input from the user, as described above. When the configure reminder option is selected from graphical element 414, CMS client 242 can present GUI 500 to allow the user to specify the values of the attributes associated with the new reminder.

In some implementations, a primitive can be used to create a reminder. For example, instead of selecting content and activating a control similar to graphical element 406, a user editing a content item can entire a reminder primitive (e.g., "#" to configure a reminder or "^" for a quick reminder) that will create a reminder with a reference to the portion of the content item the primitive was entered into. This portion can be in the content 402, in a comment 410, in another reminder 420, etc. Thus, in some implementations, selecting a section of content for a reminder can be accomplished by entering the primitive in the section of content. As with other primitives, the reminder primitive can take other primitives as parameters, e.g., by using ^@Mark to create a quick reminder for the user with the username "Mark."

In some implementations, GUI 400 can include reminders area 420. Reminders area 420 can present representations of reminders (e.g., reminder 422, reminder 424, etc.) that reference the content item, content of the content item, or comments associated with the content item presented in GUI 400. Reminders area 420 can present all reminders associated with the content item and associated with any user of content management system 106. Reminders area 420 can include comments filtered by user. For example, reminders area 420 may only present reminders associated with the user who is currently logged into content management system 106. For example, the reminder may be associated with the user when the user created the reminder or the user is mentioned in the reminder. Thus, a viewing user may see only reminders for the viewing user or the viewing user may see reminders for other users as well.

In some implementations, GUI 400 can indicate the relationship between a reminder in reminders area 420 and the corresponding content. For example, if reminder 422 references content 404, a user can select reminder 422 to cause CMS client 242 to highlight content 404 on GUI 400. If content 404 is not currently visible or displayed on GUI 400, selecting reminder 422 can cause GUI 400 to shift the content that is displayed to include content 404. Inversely, a user can select content 404 to cause CMS client 242 to highlight reminder 422 on GUI 400. Similarly, if reminder 424 references comment 412, a user can select reminder 424 to cause CMS client 242 to highlight comment 412 on GUI 400. If content comment 412 is not currently visible or displayed on GUI 400, selecting reminder 424 can cause GUI 400 to shift the comments that are displayed so that comment 412 is presented by GUI 400. Inversely, a user can select comment 412 to cause CMS client 242 to highlight reminder 424 on GUI 400.

In some implementations, a user can change the state of a reminder through GUI 400. For example, a user can select a checkbox, or other graphical element, associated with a reminder (e.g., reminder 422) to cause reminders module 202 to transition the state of the reminder from an "incomplete" state to a "complete" state. Alternatively, rather than transitioning between states, when reminders module 202 receives input (e.g., selection of a corresponding checkbox) indicating that the reminder should be dismissed, reminders module 202 can delete the reminder from reminders database 204 or mark the reminder as complete in reminders database 204 so that content management system 106 can later present completed reminders, if the user wants to see them.

FIG. 5 illustrates an example graphical user interface 500 for configuring a reminder. For example, GUI 500 can be presented by CMS client 242 on a display of client device 240 in response to the user selecting the "configure reminder" option from at least one of graphical elements 320, 406, and/or 414.

In some implementations, GUI 500 can include graphical element 502 for specifying a value for the reminder type attribute for a new reminder. For example, the user can select graphical element 502 to cause CMS client 242 to present a list of reminder types. The reminder types can include, for example, a "review" type, an "edit" type, a "send" type, and/or other reminder types. A review type can be assigned to reminders on content that a user tags for later reviewing. An edit type can be assigned to reminders on content that a user tags for later editing. A send type can be assigned to reminders on content that a user tags for sending to another user. In some implementations, a send type reminder can also specify a user or users to whom the creating user wants to later send the associated content, which can be stored with a record for the reminder. The reminder type can be used by reminders module 202 and/or CMS client 242 to filter and/or sort reminders when presenting reminders to the user (e.g., in GUI 600 described below). The type may be useful to the user to identify reminders associated with action items that the user may be able to complete more quickly than other tasks. For example, a "review" reminder type may take less time than an "edit" reminder type. A "send" reminder type may take less time than a "review" reminder type. By filtering and/or sorting reminders based on type the user may be able to quickly prioritize reminders and complete the corresponding action items.

In some implementations, GUI 500 can include graphical element 504 for specifying a value for the description attribute for a new reminder. For example, the user can provide text input (e.g., using a keyboard, voice input, etc.) to graphical element 504 to provide a description or title for the new reminder. When the description includes references to other users of content management system 106 and/or references to content items managed by content management system 106, reminders module 202 can replace the references with links to the corresponding users or content items so that the user can select the links to send a message to the linked user or open, edit, or view the linked content item when viewing a representation of the reminder.

In some implementations, GUI 500 can include graphical elements 506 and/or 508 for specifying a value for the due date attribute for a new reminder. For example, the user can provide text input (e.g., using a keyboard, voice input, etc.) to graphical element 508 to specify a due date for the new reminder. The user can select graphical element 506 to cause CMS client 242 to present a calendar from which the user can select a due date for the new reminder.

While the reminder type attribute, the description attribute, and the due date attributes may all be specified by the user using GUI 500, the reference attribute can be automatically determined by reminder module 202, as described above. Moreover, when GUI 500 is initially presented by CMS client 242, CMS client 242 can initially automatically select the values for the type, description, and due date attribute values as described above. Thus, the user only needs to change the values for the reminder attributes when the user does not want to use the automatically determined values for each attribute, as described above. Alternatively, any of the type, description, and due date attributes can be left blank to create reminders without these attributes set.

In some implementations, the user can select graphical element 510 to cause reminders module 202 to save the configured reminder. For example, in response to receiving input selecting graphical element 510, CMS client 242 can send a message to reminders module 202 including the attribute values specified in GUI 500 and with a reference to content to cause reminders module 202 to create and store a new reminder having the specified attribute values and content reference.

Figure 6:
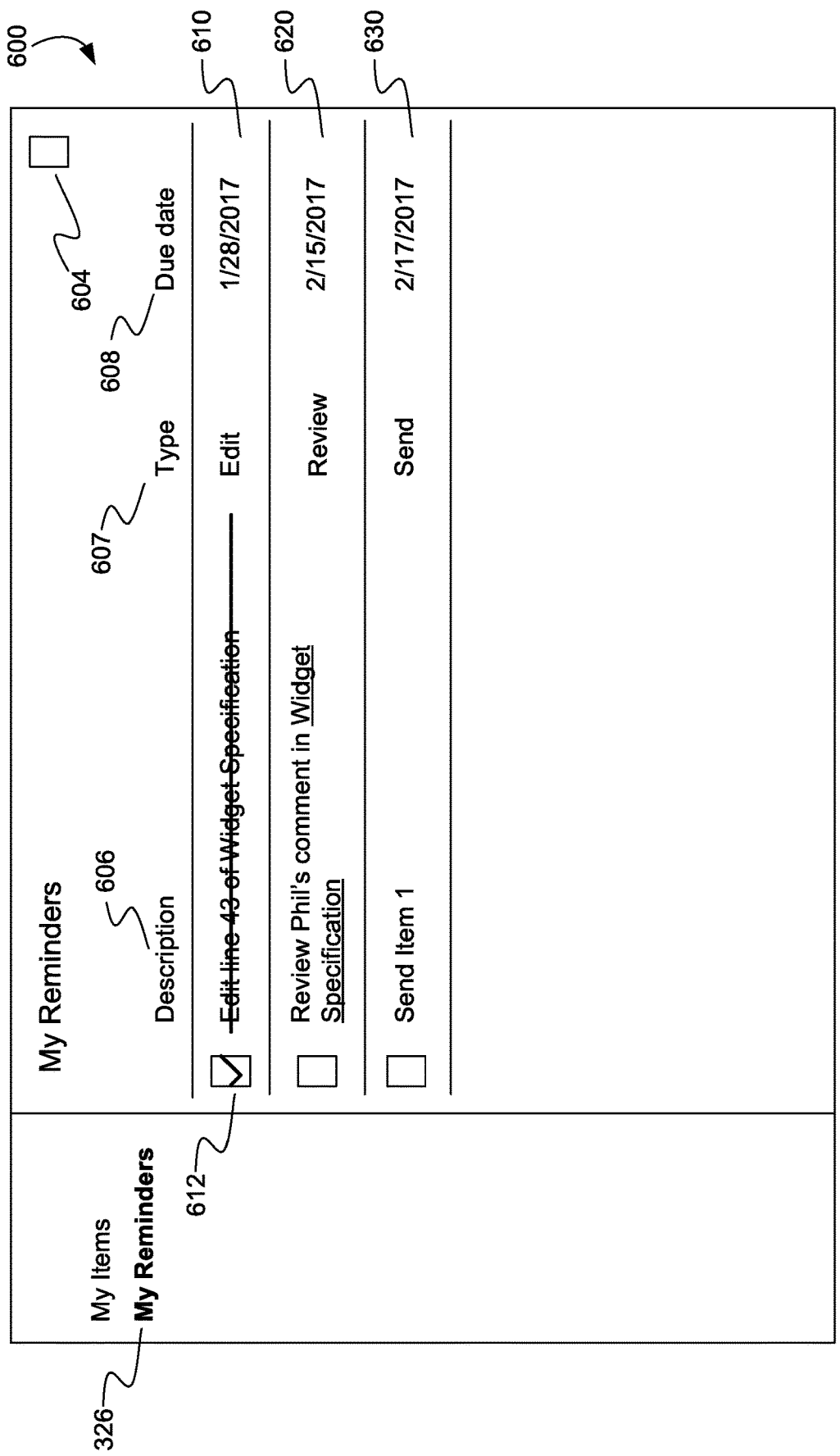
FIG. 6 illustrates an example graphical user interface for presenting reminders.

FIG. 6 illustrates an example graphical user interface 600 for presenting reminders. For example, GUI 600 can be presented on a display of client device 240 in response to the user selecting graphical element 326. GUI 600 can, for example, present reminders generated by and associated with the user (e.g., user account) currently logged into content management system 106 through client device 240. To generate GUI 600, CMS client 242 can request, from reminders module 202, reminders associated with the user. Reminders module 202 can obtain reminders associated with the user from reminders database 204 and send the reminders (e.g., reminders data) to CMS client 242. CMS client 242 can then present representations of the reminders on GUI 600. Alternatively, CMS client 242 can obtain the reminders data from reminders database 260.

In some implementations, GUI 600 can include graphical element 604 for creating a new reminder. For example, in response to receiving a selection of graphical element 604, CMS client 242 can present GUI 500 to allow the user to define a new reminder. However, in this case, since the reminder is not being created with reference to a content item (e.g., content item, content in a content item, or comment on a content item), the reference attribute of the reminder can include an empty or null value indicating that the reminder was not created with reference to a content item. In other words, the reminder is just a general reminder associated with the user but not with reference to any particular content item. However, if the user references (e.g., provides a primitive for or selects a content item from a file chooser) a content item in the description of the new reminder, as described above, reminders module 202 can automatically generate a reference to the content item mentioned in the reminder description and save the reference in reference attribute value of the newly created reminder.

In some implementations, GUI 600 can present representations of reminders associated with the current user. For example, GUI 600 can include reminder representations 610, 620, and/or 630. Each reminder representation can include a status element (e.g., a checkbox) and description, type, and due date attribute values for the corresponding reminder. The reminders presented in GUI 600 can be sorted and/or filtered by description (e.g., alphabetical), type, and/or due date by selecting heading elements 606, 607, and/or 608 corresponding to description, type, and due date, respectively.

In some implementations, the user can change the status of a reminder by selecting a status element corresponding to the reminder. For example, the user can select graphical element 612 to cause reminder module 202 to change the status of the corresponding reminder from "incomplete" to "complete" or to delete the corresponding reminder. To indicate that the reminder has been completed or deleted, reminder module 202 may temporarily present reminder representation 610 with a strikethrough line to represent that the reminder (e.g., the action item associated with the reminder) has been completed. In some implementations, reminders can be associated with other statuses. For example, a user can provide input to GUI 600 to indicate that a reminder is in progress. Reminder module 202 can change the status of the corresponding reminder from "incomplete" to "in-progress" and present an indication of the in-progress status of the reminder on GUI 600.

In some implementations, the reminders listed on the "My Reminders" list can be organized according to their associated content items. In some cases, where the reminders are organized in this manner, a heading can be provided corresponding to the title or file name of each referenced content item. In some implementations, the heading can include a reference (e.g., a link) to the associated content item. For example, the underlined portion "Widget Specification" can be a link that will open the Widget Specification collaboration content item. In some implementations, the content item reference can be excluded from the reminder description when the description is organized under a heading for the referenced content item. For example, in FIG. 6, reminder representations 610 and 620 refer to the content item "Widget Specification" and reminder representation 630 refers to the content item "Item 1." A first heading "Widget Specification" can be provided that links to the Widget Specification content item and reminder representations 610 and 620 can be organized under this heading. Reminder representations 610 and 620 can then include a description that excludes the content item title. Instead reminder representations 610 and 620 can read "Edit line 43" and "Review Phil's comment," respectively. Similarly, a second heading, "Item 1," can be provided that links to the Item 1 content item and reminder representation 630 can be organized under this heading. Reminder representation 630 can also include a description "Send" that doesn't include the content item reference.

In some implementations, reminder representations corresponding to reminders with a "send" type, such as reminder representation 630, can further specify a recipient user. This can be the user to which the reminder is to be sent. In some implementations, the reminder representation can include a link, button, or other mechanism that causes the reminders module 202 to automatically share the corresponding content with the specified recipient user. For example, the reminders module 202 can automatically share the content with the specified recipient user's user account. In some implementations, this sharing can include sending a reference, to the corresponding content, to the specified user account and/or modifying permissions on a collaboration content item containing the corresponding content. In some implementations, actuating the link can trigger an interface to enter a sharing message to send to the specified recipient user account, in addition to the automatic sharing of the corresponding content.

Figure 7:
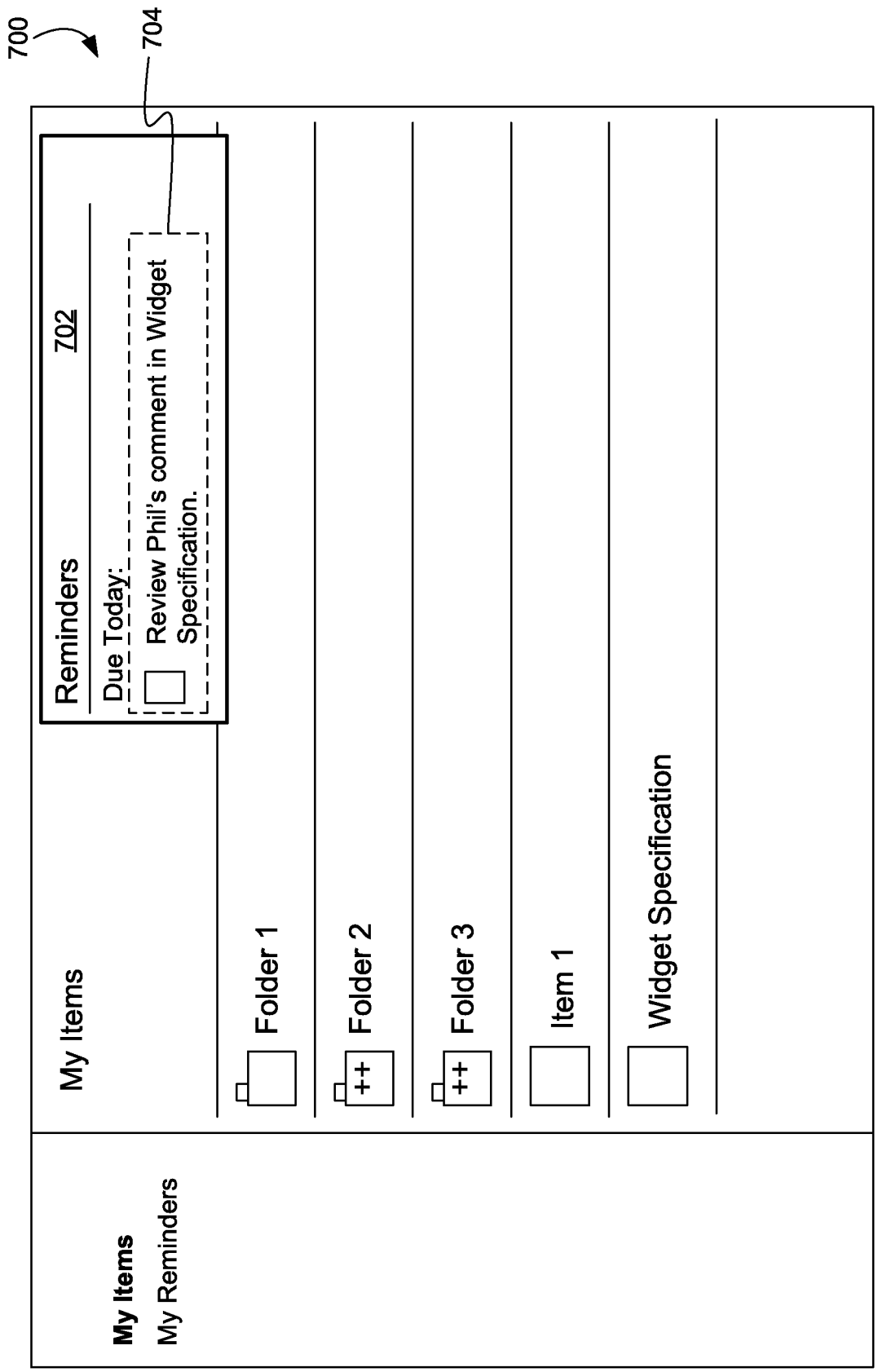
FIG. 7 illustrates an example graphical user interface for presenting notifications associated with reminders.

FIG. 7 illustrates an example graphical user interface 700 for presenting notifications associated with reminders. For example, GUI 700 can be presented by CMS client 242 on a display of client device 240. GUI 700 can be presented by CMS daemon 244 on a display of client device 240. GUI 700 can be presented by the operating system of client device 240.

In some implementations, GUI 700 can include graphical element 702 for presenting reminders. For example, graphical element 702 can be a notification, window, popup, pull down, or other graphical element for presenting reminder notifications to the user on the display of client device 240. In some implementations, reminders module 202 can monitor due dates for reminders in reminders database 204. When a due date is reached (e.g., the current date corresponds to the due date in the reminder), reminders module 202 can send a notification (e.g., message) to client device 240, including the reminders data associated with the reminders that have reached their due dates. For example, reminders module 202 can send the notification to CMS client 242, CMS daemon 244, and/or the operating system of client device 240. In some implementations, the notification can be sent as an email, push notification, or instant message to an appropriate messaging application on client device 240. When client device 240 receives the notification, CMS client 242, CMS daemon 244, another client application, and/or the operating system can present graphical element 702, including the reminders data included in the notification, on a display of client device 240.

In some implementations, graphical element 702 can include reminder representation 704. For example, reminder representation 704 (e.g., reminder 704) can include some or all of the reminders data for a particular reminder as received by CMS client 242, CMS daemon 244, another client application, and/or the operating system in the reminders notification described above. Graphical element 702 can include one reminder 704 or multiple reminders 704 representing different reminders that have reached their respective due dates. Reminder 704 can include a description of the corresponding reminder. Reminder 704 can include a status element (e.g., checkbox, toggle, drop down menu, etc.) for changing the status of the corresponding reminder. For example, the user can select the status element to cause reminder module 202 to change the status of the reminder from "incomplete" to "complete" or to delete the reminder from reminders database 204.

In some implementations, the user can select reminder 704 to cause CMS client 242 to present the content item referenced by the corresponding reminder. For example, if the reminder was created with reference to a content item, CMS client 242 can present and/or highlight the corresponding content item in a content item browser window. If the reminder was created with reference to content within a content item, CMS client 242 can open the corresponding content item and present and/or highlight the corresponding content on a display of client device 240. If the reminder was created with reference to comment within a content item, CMS client 242 can open the corresponding content item and present and/or highlight the corresponding comment on a display of client device 240. Thus, the user can quickly take action with respect to the referenced content item, content, or comment by selecting a reminder presented in graphical element 702.

Example Processes

Figure 8:
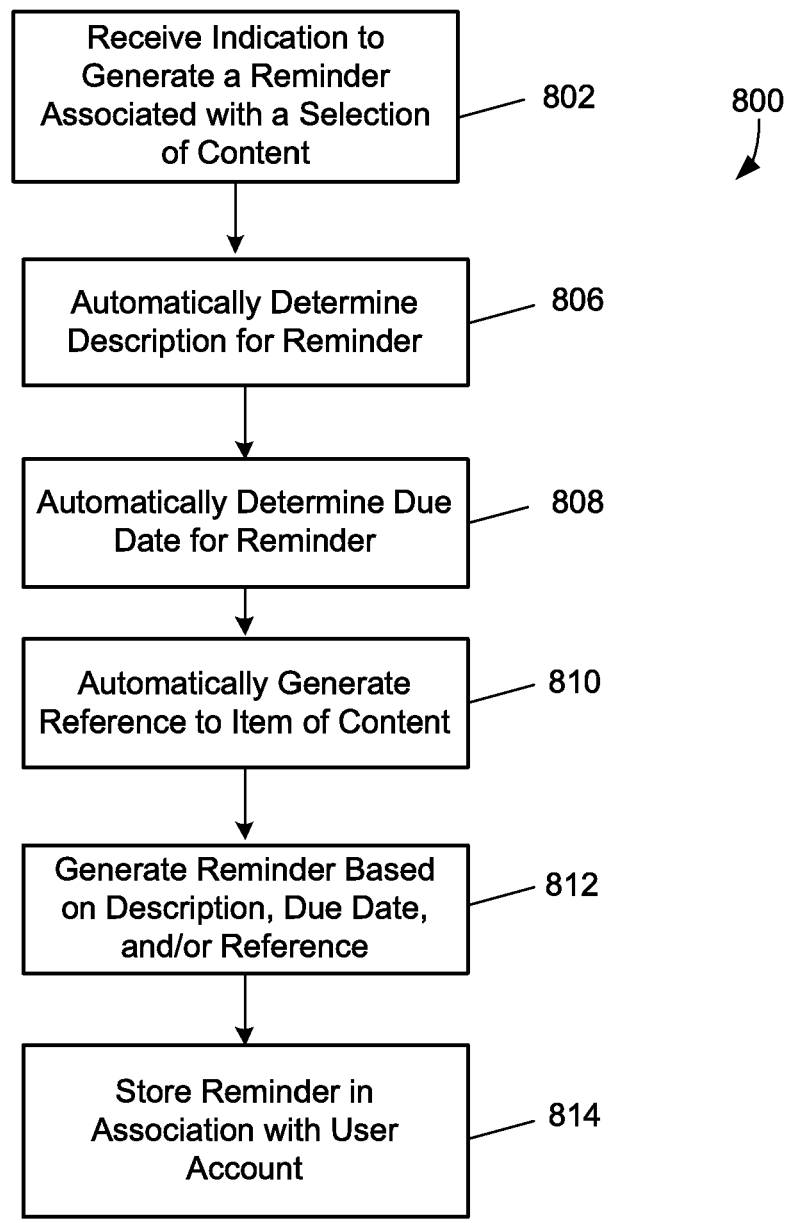
FIG. 8 illustrates an example process for automatically generating a reminder.

FIG. 8 illustrates an example process 800 for automatically generating a reminder.

At step 802, a computing system (e.g., content management system 106) can receive an indication to generate a reminder associated with a selection of content. For example, this indication can be received from CMS client 242, in response to receiving user input selecting content and triggering reminder creation, such as through a UI command or text primitive. For example, CMS client 242 can receive user input invoking options for creating reminders, as described with reference to FIG. 3 and FIG. 4 above. In some implementations, the indication received at block 802 is in response to CMS client 242 receiving a user selection of the quick reminder option to indicate that the user wishes to generate a new reminder using the quick reminder option and sending a message to reminders module 202 indicating that the user wishes to generate a quick reminder for the selected content. The content can be a content item (e.g., file, document, image, etc.). The content can be content within a content item (e.g., text, image, etc.). The content can be metadata associated with a content item (e.g., a comment). CMS client 242 can send an identifier for the selected content to reminders module 202. For example, the identifier can be a reference (e.g., link, URL, file path, contentID, etc.) that identifies the selected content item, content within the content item, or metadata associated with the content item.

At step 806, the computing system can automatically determine a description for the reminder. For example, reminders module 202 can automatically generate a description that includes a name or identifier for the selected content. Reminders module 202 can automatically determine the reminder type and/or include the reminder type in the description. For example, if the identifier is for content within a content item (e.g., widget specification, line 43) and the determined reminder type is "review," then reminders module can prepend the reminder type to the identifier of the item of content to generate the description "Review widget specification, line 43."

At step 808, the computing system can automatically determine a due date for the reminder. For example, reminders module 202 can automatically determine a due date for the reminder based on a pre-configured or user-configured period of time. The period of time can be 1 day, 2 days, 1 week, or some other period of time. For example, if the configured period of time is 2 days, then reminders module 202 can set the due date for the reminder to be 2 days from the time the reminders module 202 created the reminder. In some implementations, reminders module 202 can automatically determine the due date for the reminder based on context associated with the creation of the reminder. For example, the context can include the content of the content item corresponding to the reminder. The context can include the content of the comment corresponding to the reminder. For example, if the reminder is associated with a comment that includes a date (e.g., "Kevin, please review by Feb. 3, 2017"), then reminders module 202 can automatically determine the due date for the reminder based on the date specified in the comment.

At step 810, the computing system can automatically generate a reference to the content. For example, reminders module 202 can generate a reference based on the identifier received from CMS client 242. Reminders module 202 can generate a reference based on the content management system identifier for the corresponding content item, location of the selected content within the content item, and/or identifier for the corresponding comment.

At step 812, the computing system can generate a record for the reminder based on the reminder type, description, due date, and/or reference. For example, reminders module 202 can generate a reminder record that has type, description, due date, and/or reference attributes automatically determined by reminders module 202, as described above.

At step 814, the computing system can store the reminder record in association with the user's account. For example, reminders module 202 can store the reminder record (e.g., reminder attributes) in a database record in association with an identifier for the user's account with content management system 106. Thus, reminders module 202 can monitor reminders in the reminders database to determine when reminders come due and use the user account identifiers to send due date notifications to the appropriate users and/or user accounts.

Process 800 can be performed on server systems, such as by reminders module 202 on content management system 106. However, in some implementations, all or parts of process 800 can be performed client-side, e.g., by CMS client 242 on client device 240.

Figure 9:
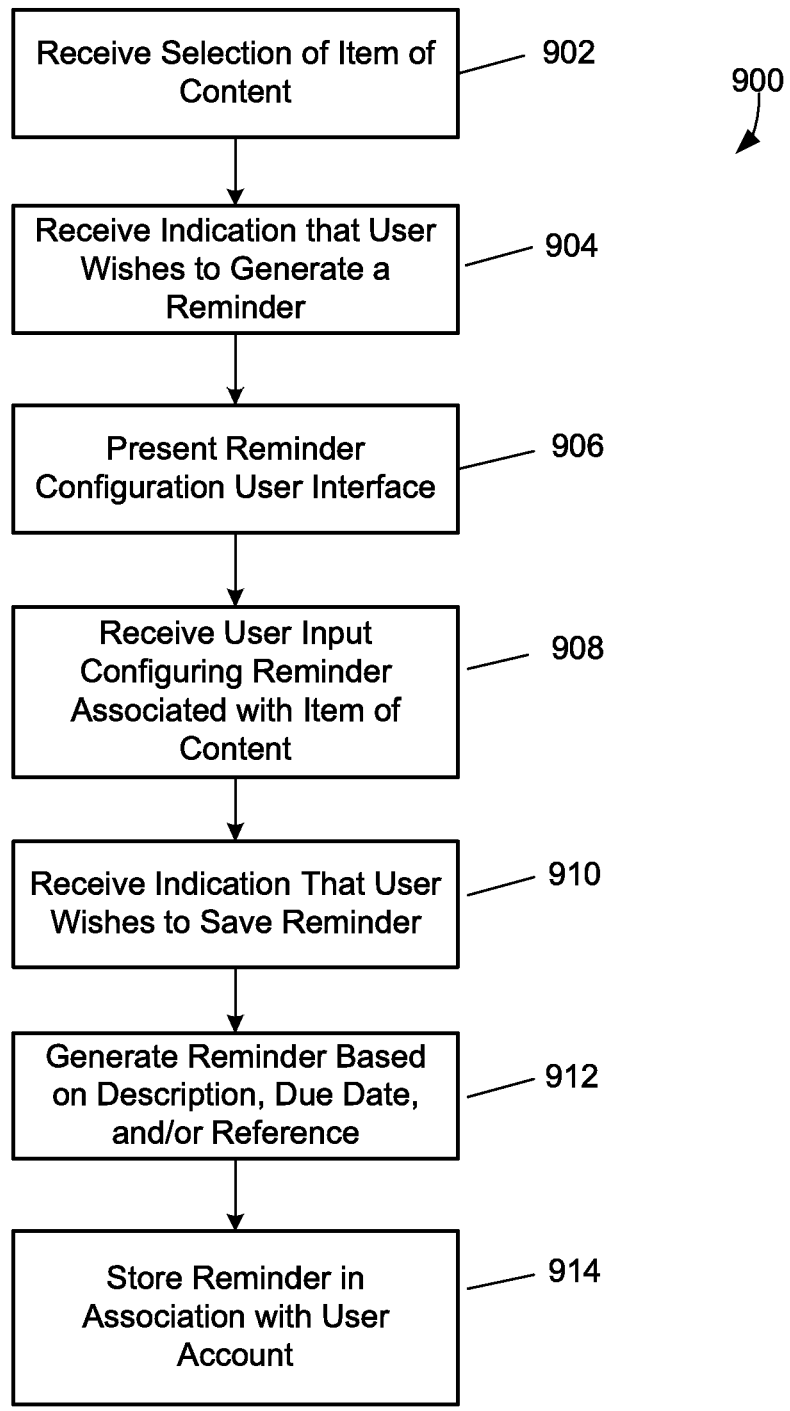
FIG. 9 illustrates an example processes for configuring a reminder.

FIG. 9 illustrates an example process 900 for configuring a reminder. For example, process 900 can be performed by reminders module 202 on content management system 106. Process 900 can be performed by CMS client 242 on client device 240. Process 900 can be performed by a combination of reminders module 202 and/or CMS client 242. For example, CMS client 242 can present graphical user interfaces for receiving user content selections and receive user input for creating or configuring reminders while reminders module 202 can receive reminders configuration data from CMS client 242 and generate and store a reminder's record with the reminders configuration information (e.g., reminders attributes).

At step 902, a computing system device can receive a selection of an item of content. For example, CMS client 242 can receive user input selecting an item of content. The item of content can be a content item (e.g., file, document, image, etc.). The item of content can be content within a content item (e.g., text, image, etc.). The item of content can be metadata associated with a content item (e.g., a comment).

CMS client 242 can send an identifier for the selected item of content to reminders module 202. For example, the identifier can be a reference (e.g., link, URL, file path, etc.) that identifies the selected content item, content, or metadata.

At step 904, the computing device can receive an indication that the user wishes to generate a reminder. For example, CMS client 242 can identify a reminder primitive or receive user input invoking an options interface for creating reminders, as described with reference to FIG. 3 and FIG. 4 above. CMS client 242 can receive a user selection of the configure reminder option to indicate that the user wishes to configure a new reminder. CMS client 242 can send a message to reminders module 202 indicating that the user wishes to configure a reminder for the selected item of content. For example, the message can include the identifier or reference for the item of content.

At step 906, the computing system can present a reminder configuration user interface, such as the reminder configuration user interface described above with reference to FIG. 5.

At step 908, the computing system can receive user input configuring the reminder associated with the item of content. For example, the user can provide input to the reminder configuration user interface presented by CMS client 242 specifying type, description, and due date attribute values for the new reminder. CMS client 242 can then send the reminder attribute values to reminders module 202. Reminders module 202 can automatically generate the reference attribute value for the reminder. For example, reminders module 202 can generate a reference based on the identifier received from CMS client 242. Reminders module 202 can generate a reference based on the content management system identifier for the corresponding content item, location of the selected content within the content item, and/or identifier for the corresponding comment.

At step 910, the computing system can receive an indication that the user wishes to save the reminder. For example, the user can select a save button presented on the reminder configuration user interface presented by CMS client 242. CMS client 242 can then send a message to reminders module indicating that the user wishes to save the configured reminder.

At step 912, the computing system can generate a reminder based on the reminder type, description, due date, and/or reference. For example, reminders module 202 can generate a reminder that has type, description, and/or due date attribute values specified by the user and/or the reference attribute value automatically determined by reminders module 202, as described above.

At step 914, the computing system can store the reminder in association with the user's account. For example, reminders module 202 can store the reminder (e.g., reminder attributes) in a database record in association with an identifier for the user's account with content management system 106. Thus, reminders module 202 can monitor the reminders in the reminders database to determine when reminders come due and use the user account identifiers to send due date notifications to the appropriate users and/or user accounts.

Figure 10:
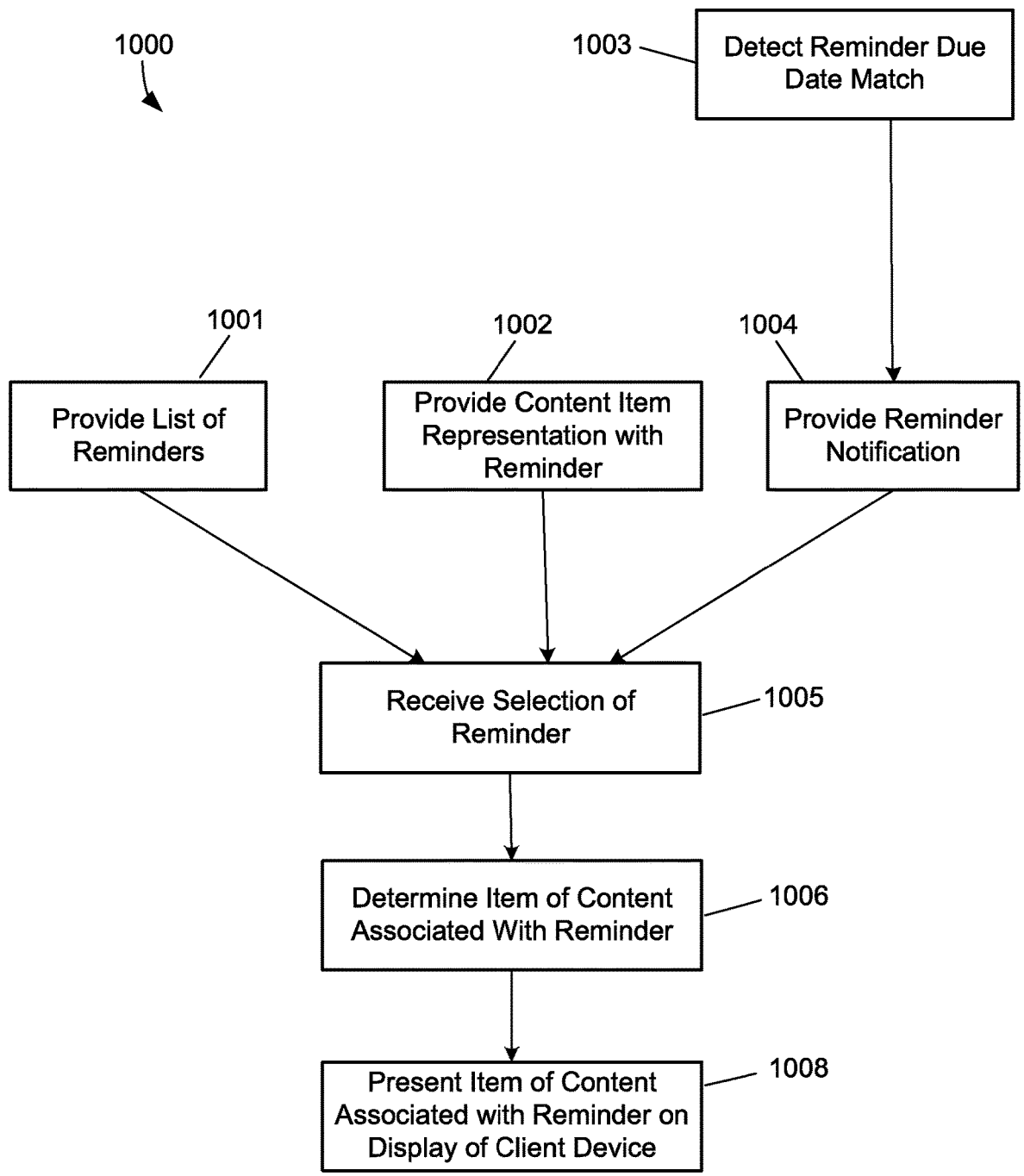
FIG. 10 illustrates an example process for providing access to items of content associated with a reminder.

FIG. 10 illustrates an example process 1000 for providing access to items of content associated via a reminder. For example, process 1000 can be performed by reminders module 202 on content management system 106. Process 1000 can be performed by CMS client 242 on client device 240.

At step 1001, a computing system (e.g., content management system 106) can provide, to a client device, a list of reminders that relate to a current user (e.g., created by the current user or mention the current user). The list of reminders can be an aggregation of reminders from multiple different content items. For example, CMS client 242 can receive reminders data from reminders module 202 the include all the reminders the user has created and/or that mention the user. The reminders data can be presented on a user interface of CMS client 242, as described above with reference to FIG. 6.

At step 1002, the computing system can provide, to a client device, a representation of a content item that includes a reminder for display by the client device. For example, CMS client 242 can provide a request for a content item to content management system 106. In response, content management system 106 can retrieve reminders data from reminders module 202 for the requested content item. The content management system 106 can then present the reminders data in the representation of the content item for display on a user interface of CMS client 242, as described above with reference to FIG. 4.

At step 1003, the computing system can determine that the current time or date matches one or more reminders. For example, the computing system can periodically compare the current time and/or date with the time and/or date configured for the reminders stored in reminders database 204. When the due date for a particular reminder stored in reminders database 204 matches the current date and/or time, the computing system can determine that a reminder notification for the particular reminder should be send to CMS client 242.

At step 1004, the computing system can generate and provide, to a client device, notifications for the reminders selected at block 1003. For example, CMS client 242 can receive reminders data from reminders module 202 and present the reminders data in a notification on a user interface of CMS client 242, as described above with reference to FIG. 7.

At step 1005, the computing system can receive a selection of a reminder. For example, CMS client 242 can receive user input with respect to a reminder presented on a display of client device 240. For example, CMS client 242 can receive user input selecting a reminder presented within a content item GUI, as described with reference to FIG. 4. CMS client 242 can receive user input selecting a reminder presented within a reminder list GUI, as described with reference to FIG. 5. CMS client 242 can receive user input selecting a reminder presented within a reminders notification GUI, as described with reference to FIG. 7.

At step 1006, the computing system can determine an item of content associated with the selected reminder. For example, in response to receiving the user selection of the reminder, CMS client 242 can obtain the value of the reference attribute of the selected reminder.

At step 1008, the computing system can cause the content associated with the reminder to be displayed by the client device. For example, CMS client 242 can send the value of the reference attribute of the selected reminder to content management system 106. In response, content management system 106 can obtain the corresponding content or a representation of the corresponding content and provide it to the CMS client 242. In response to obtaining the content, CMS client 242 can present the content on the display of the computing device. For example, if the value of the reference attribute points to a content item, CMS client 242 can present a content item browser (e.g., navigation user interface) that highlights the content item. Alternatively, if the value of the reference attribute points to a content item, CMS client 242 can open the content item and present the content of the content item on the display of the computing device. If the value of the reference attribute points to content (e.g., a location) within a content item, CMS client 242 can open the content item and/or highlight the portion or location within the content item to which the reference points. If the value of the reference attribute points to a comment associated with a content item, CMS client 242 can open the content item and/or highlight a comment associated with the content item to which the reference points. Thus, the user can select a reminder to quickly navigate to a content item, content within a content item, and/or comment for which the reminder was created.

The paragraphs above describe processes performed by various computing systems for managing reminders in a content management system. While the processes described above describe specific steps performed in a particular order, the steps of the processes may be performed in a different order and/or with fewer steps while still producing the same or similar results. For example, some steps may be omitted and other steps may be rearranged while still staying within the scope of the technology disclosed herein.

Figure 11A:
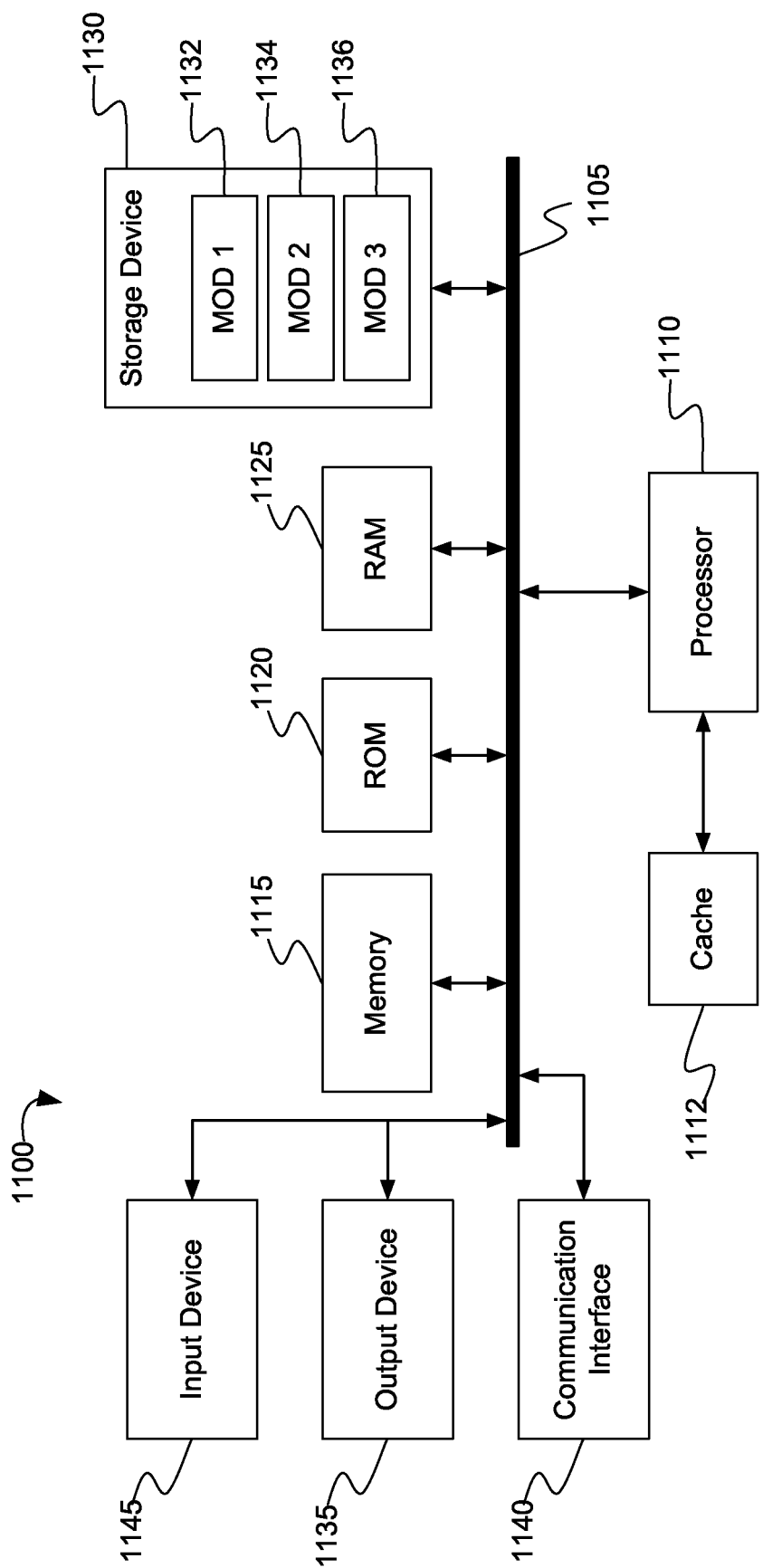
FIG. 11A shows an example possible system embodiment for implementing various embodiments of the present technology.
Figure 11B:
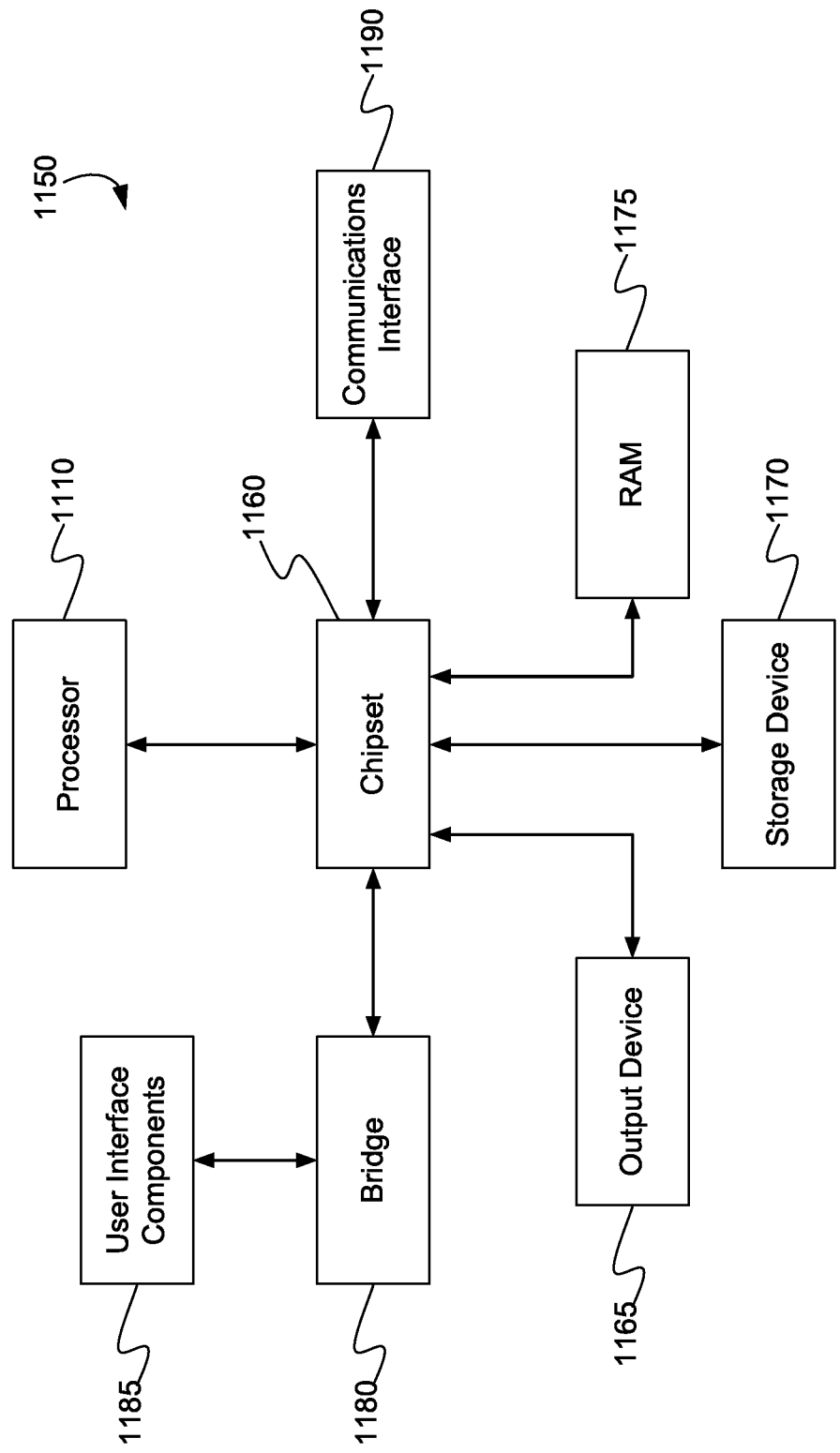
FIG. 11B shows an example possible system embodiment for implementing various embodiments of the present technology.

FIG. 11A and FIG. 11B show example possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Example system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1110, representative of any number of physically and/or logically distinct resources capable of executing software, firmware, and hardware configured to perform identified computations. Processor 1110 can communicate with a chipset 1160 that can control input to and output from processor 1110. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1110 analyzing data stored in storage 1170 or 1175. Further, the machine can receive inputs from a user via user interface components 1185 and execute appropriate functions, such as browsing functions by interpreting these inputs using processor 1110.

It can be appreciated that example systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range.

Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. Moreover, claim language reciting "at least one of" an element or another element refers to any possible permutation of the set of elements. For example, claim language reciting "at least one of A and B" or "at least one of A or B" means "A, B, or both A and B."

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computing system comprising:
   one or more processors; and
   a non-transitory computer readable medium including one or more instructions that, when executed by the one or more processors, cause the computing system to perform operations comprising:
   learning, by the computing system, habits of a user with respect to how the user interacted with content items;
   causing, by the computing system, display of a graphical user interface presenting a collaboration content item associated with the user;
   receiving, by the computing system, an indication to generate a reminder associated with an element of the collaboration content item via the graphical user interface;
   responsive to the indication, automatically generating, by the computing system, the reminder based on the learned habits of the user, wherein the generating comprising:
   identifying an attribute of the collaboration content item,
   determining, based on the attribute and the learned habits of the user, a type of reminder to generate for the indication, and
   generating a reminder record for the reminder, wherein the reminder record comprises at least the determined type for the reminder;
   storing, by the computing system, the reminder record associated with a user account and the element of the collaboration content item;
   generating, by the computing system, a representation of the reminder, based on the reminder record, wherein the representation of the reminder includes a reference to the element of the collaboration content item;

updating, by the computing system, the graphical user interface to include the representation of the reminder;

detecting, by the computing system, user interaction with the representation of the reminder;

responsive to detecting the user interaction,
updating, by the computing system, the graphical user interface to include the collaboration content item, and
augmenting, by the computing system, a display of the collaboration content item in the graphical user interface by visually emphasizing the element in the collaboration content item that is associated with the reminder.

2. The computing system of claim 1, wherein the indication to generate the reminder comprises a type, the type specifying the reminder is to send the element to a recipient user account;
wherein the indication to generate the reminder further identifies the recipient user account;
wherein the stored reminder record includes a further indication of the recipient user account; and
wherein the generated representation of the reminder includes a further reference for the recipient user account.

3. The computing system of claim 2, wherein the operations further comprise:
receiving a notification that the reference for the recipient user account was selected; and
in response, automatically providing, to the recipient user account, an identification of the element.

4. The computing system of claim 1, wherein the operations further comprise:
determining one or more values for one or more attributes of the reminder record, the one or more values for the one or more attributes comprising a reminder description.

5. The computing system of claim 4, wherein storing, by the computing system, the reminder record associated with the user account and the element of the collaboration content item, comprises:
storing the reminder description with the reminder record.

6. The computing system of claim 1, wherein the operations further comprise:
monitoring the stored reminder record stored to determine when the reminder comes due.

7. The computing system of claim 6, wherein the operations further comprise:
determining that the reminder is about to come due;
identifying a user account identifier associated with the reminder; and
notifying the user corresponding to the user account identifier about the reminder.

8. The computing system of claim 1, wherein the operations further comprise:
learning, by the computing system, additional habits of a set of users that are similar to the user with respect to how the set of users interacted with the content items.

9. The computing system of claim 8, wherein responsive to the indication, automatically generating, by the computing system, a second reminder based on the learned habits of the user and the similar set of users comprises:
generating the second reminder based on the learned additional habits of the set of users.

10. The computing system of claim 1, wherein visually emphasizing the element comprises highlighting the element.

11. A method, comprising:
learning, by a computing system, habits of a user with respect to how the user interacted with content items;
causing, by the computing system, display of a graphical user interface presenting a collaboration content item associated with the user;
receiving, by the computing system, an indication to generate a reminder associated with an element of the collaboration content item via the graphical user interface;
responsive to the indication, automatically generating, by the computing system, the reminder based on the learned habits of the user, wherein the generating comprising:
identifying an attribute of the collaboration content item,
determining, based on the attribute and the learned habits of the user, a type of reminder to generate for the indication, and
generating a reminder record for the reminder, wherein the reminder record comprises at least the determined type for the reminder;
storing, by the computing system, the reminder record associated with a user account and the element of the collaboration content item;
generating, by the computing system, a representation of the reminder, based on the reminder record, wherein the representation of the reminder includes a reference to the element of the collaboration content item;
updating, by the computing system, the graphical user interface to include the representation of the reminder; and
detecting, by the computing system, user interaction with the representation of the reminder; and
responsive to detecting the user interaction,
updating, by the computing system, the graphical user interface to include the collaboration content item, and
augmenting, by the computing system, a display of the collaboration content item in the graphical user interface by visually emphasizing the element in the collaboration content item that is associated with the reminder.

12. The method of claim 11, wherein the indication to generate the reminder comprises a type, the type specifying the reminder is to send the element to a recipient user account;
wherein the indication to generate the reminder further identifies the recipient user account;
wherein the stored reminder record includes a further indication of the recipient user account; and
wherein the representation of the reminder includes a further reference for the recipient user account.

13. The method of claim 12, further comprising:
receiving a notification that the reference for the recipient user account was selected; and
in response, automatically providing, to the recipient user account, an identification of the element.

14. The method of claim 11, further comprising:
determining one or more values for one or more attributes of the reminder record, the one or more values for the one or more attributes comprising a reminder description.

15. The method of claim 14, wherein storing, by the computing system, the reminder record associated with the user account and the element of the collaboration content item, comprises:
   storing the reminder description with the reminder record.

16. The method of claim 11, further comprising:
   monitoring the stored reminder record to determine when the reminder comes due.

17. The method of claim 16, further comprising:
   determining that the reminder is about to come due;
   identifying a user account identifier associated with the reminder; and
   notifying the user corresponding to the user account identifier about the reminder.

\* \* \* \* \*